(12) United States Patent
Yokoyama et al.

(10) Patent No.: US 9,306,412 B2
(45) Date of Patent: Apr. 5, 2016

(54) OPTIMUM CHARGING FOR ELECTRIC-BASED VEHICLE

(75) Inventors: Akihisa Yokoyama, Cupertino, CA (US); Kunihiko Kumita, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 649 days.

(21) Appl. No.: 13/436,561

(22) Filed: Mar. 30, 2012

(65) Prior Publication Data

US 2013/0257387 A1    Oct. 3, 2013

(51) Int. Cl.
    *H02J 7/00*    (2006.01)
    *H02J 7/04*    (2006.01)

(52) U.S. Cl.
    CPC .............. *H02J 7/044* (2013.01); *H02J 7/0027* (2013.01)

(58) Field of Classification Search
    USPC .......................................... 320/132, 104, 109
    See application file for complete search history.

(56) References Cited

U.S. PATENT DOCUMENTS

| 2003/0052647 | A1* | 3/2003 | Yoshida et al. ............... 320/125 |
| 2005/0125148 | A1 | 6/2005 | Van Buer et al. |
| 2009/0140698 | A1* | 6/2009 | Eberhard et al. ............. 320/152 |
| 2009/0313098 | A1 | 12/2009 | Hafner et al. |
| 2010/0006356 | A1* | 1/2010 | Curry et al. .................. 180/65.8 |
| 2010/0094496 | A1 | 4/2010 | Hershkovitz et al. |
| 2010/0174667 | A1* | 7/2010 | Vitale et al. ................... 705/412 |
| 2010/0206957 | A1 | 8/2010 | Vyas et al. |
| 2010/0268456 | A1 | 10/2010 | Kantarjiev et al. |
| 2010/0280703 | A1 | 11/2010 | Eckhoff et al. |
| 2011/0071932 | A1 | 3/2011 | Agassi et al. |
| 2011/0071955 | A1 | 3/2011 | Nakamura et al. |
| 2011/0130885 | A1 | 6/2011 | Bowen et al. |
| 2011/0246252 | A1 | 10/2011 | Uesugi |
| 2012/0029711 | A1* | 2/2012 | Besore et al. ................. 700/287 |
| 2014/0006137 | A1 | 1/2014 | Melen et al. |

FOREIGN PATENT DOCUMENTS

JP    2011-259652    12/2011

OTHER PUBLICATIONS

Non-Final Office Action mailed Jul. 2, 2015, U.S. Appl. No. 13/850,183 (19 pages).
Final Office Action mailed Oct. 6, 2015, U.S. Appl. No. 13/850,183 (23 pages).
Non-Final Office Action mailed Jul. 28, 2015, U.S. Appl. No. 13/536,729 (27 pages).
Non-Final Office Action mailed Jun. 4, 2015, U.S. Appl. No. 13/757,663 (20 pages).
Final Office Action mailed Oct. 6, 2015, U.S. Appl. No. 13/757,663 (30 pages).

* cited by examiner

*Primary Examiner* — Samuel Berhanu
(74) *Attorney, Agent, or Firm* — Patents Law Works LLP

(57) ABSTRACT

A system and method for controlling charging for a vehicle is disclosed. The system comprises a statistical analyzer, an estimation module and a determination module. The statistical analyzer analyzes a set of data describing utility rate information and one or more behaviors of the vehicle. The estimation module estimates one or more tendency parameters based at least in part on the analyzing. The determination module determines a charging setting based at least in part on the one or more tendency parameters. The charging setting comprises one or more of a target charging battery state of charge (SoC), a charging start time and a charging end time.

27 Claims, 12 Drawing Sheets

| PHV | EV | Conclusions |
|---|---|---|
| Combustion engine is still available even if the battery runs out | Running out of gas is fatal; EVSE is not necessarily available everywhere at this time and in near future; charging takes much time | More speculative control should be available => SoC requirement for charging is not necessarily 100% |
| Battery capacity of PHV is 1/5 of that of EV (PHV Prius: 5.2kWh); cf. normal Prius: 1.3kwh | Battery capacity is larger than that of PHV (Leaf: 24kWh, Volt: 16kWh) | Since PHV has smaller battery capacity, it might be able to take advantage of the cheaper power supply more effectively |
| PHV should run as EV with battery to take advantage of the specification of PHV (HV is much cost-effective than PHV in HV mode) | Driving by electricity is essential for EV | Running as EV is preferable for PHV, but it needs the optimization on the cost-performance balance |
| PHV will not be equipped with fast DC charger | Most EVs are equipped with fast DC chargers due to the large battery capacity | Generally PHV will be charged at home and office, because charging will take some time and charging away from home or office will not be suitable |
| HV will be transferred to PHV and PHV gains much more popularity (Cumulative shipments of Prius is over 1 million by April, 2011) | EV is not estimated to gain huge popularity regarding the limited EVSE infrastructure dissemination | Toyota will deploy much more PHV lineups for more car lines. |

Figure 6

OPTIMUM CHARGING FOR ELECTRIC-BASED VEHICLE

BACKGROUND

The specification relates to vehicle charging systems. In particular, the specification relates to a system and method for controlling charging for a vehicle, especially for an electric vehicle ("EV" or "EVs") or a plug-in hybrid vehicle ("PHV" or "PHVs").

Technologies related to EV and PHV have been developing rapidly, which in turn promotes the popularization of these vehicles. Technology for charging EV and PHV is becoming increasingly important to the development of these vehicles. Users desire to develop an optimized charging plan for their vehicles. However, since the charging for an EV or a PHV depends on behaviors of these vehicles, users need to learn their vehicle's behavior before developing their charging plan. Unfortunately, it is frequently cumbersome for users to accurately capture the behaviors of their vehicle. As a result, these users fail to develop an optimized charging plan for their vehicles.

Furthermore, since the battery capacity of a PHV is smaller relative to other batteries, and since the price of electricity fluctuates throughout the day (e.g., electricity is generally cheaper at night versus during the day), it is possible to take advantage of fluctuations in the cost of electricity to charge the PHV more cost-efficiently. However, such optimization requires an understanding of the behaviors of the PHV as well as the utility pricing information. Unfortunately, many users do not possess this knowledge and thus fail to optimize their vehicle charging plan.

SUMMARY OF THE INVENTION

The specification overcomes the deficiencies and limitations of the prior art at least in part by providing a system and method for controlling charging for a vehicle. The system comprises a statistical analyzer, an estimation module and a determination module. The statistical analyzer analyzes a set of data describing utility rate information and one or more behaviors of the vehicle. The estimation module is communicatively coupled to the statistical analyzer and estimates one or more tendency parameters based at least in part on the analyzing. The determination module is communicatively coupled to the estimation module and determines a charging setting based at least in part on the one or more tendency parameters. The charging setting comprises one or more of a target charging battery state of charge ("SoC" or "SoCs"), a charging start time and a charging end time.

BRIEF DESCRIPTION OF THE DRAWINGS

The specification is illustrated by way of example, and not by way of limitation in the figures of the accompanying drawings in which like reference numerals are used to refer to similar elements.

FIG. 6 shows a table illustrating a comparison between PHV and EV according to one embodiment.

DETAILED DESCRIPTION OF THE PREFERRED EMBODIMENTS

Figure 1:
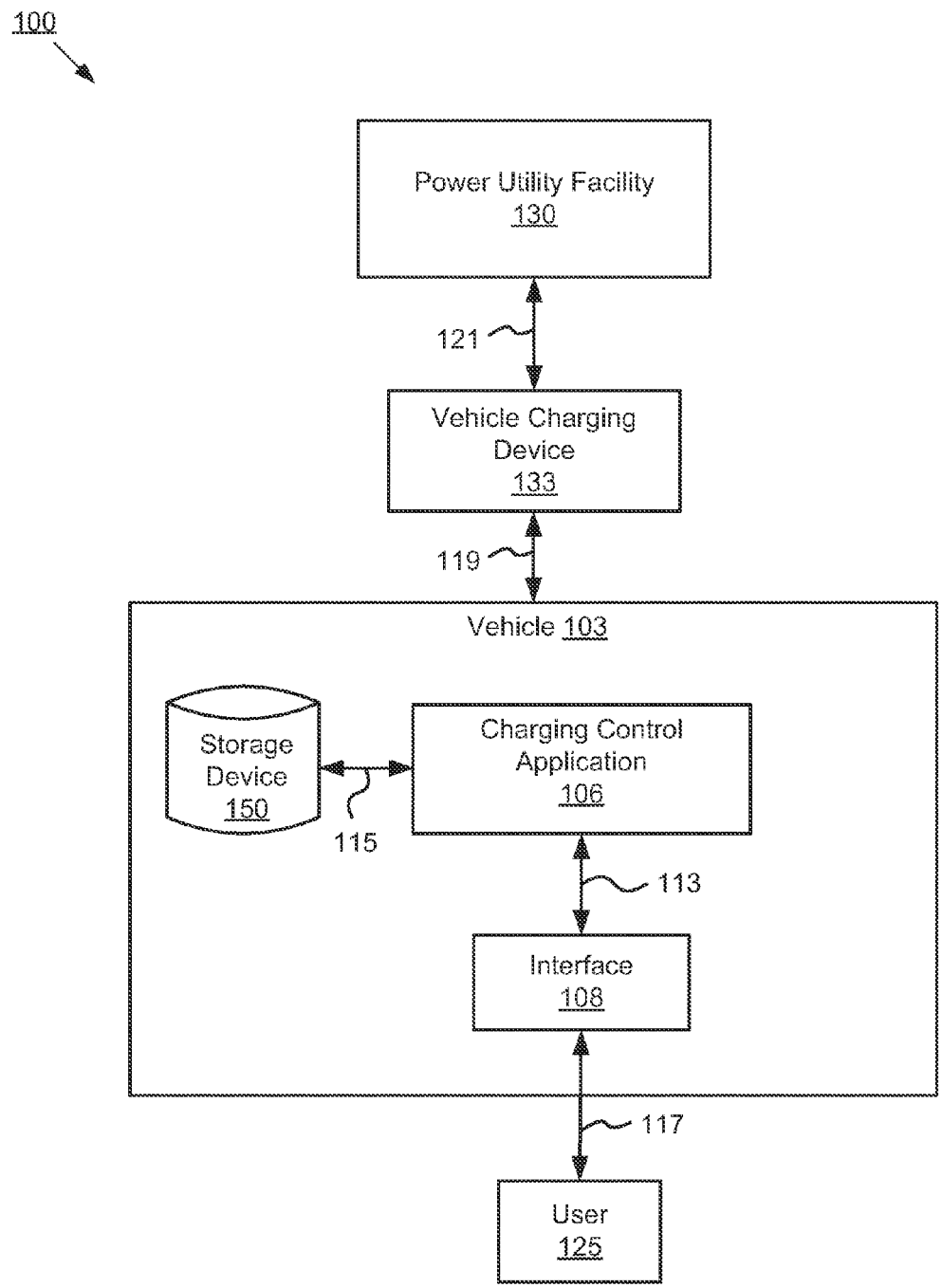
FIG. 1 is a high-level block diagram illustrating a system for controlling charging for a vehicle according to one embodiment.

A system and method for controlling charging for a vehicle is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, compact disc read-only memories ("CD-ROMs"), magnetic disks, read-only memories ("ROMs"), random access memories ("RAMs"), erasable programmable read-only memories ("EPROMs"), electrically erasable programmable read-only memories ("EEPROMs"), magnetic or optical cards, flash memories including universal serial bus ("USB") keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for controlling charging for a vehicle according to one embodiment. The illustrated system 100 includes a vehicle 103 that is accessed by a user 125, a vehicle charging device 133 and a power utility facility 130. The vehicle system 103 includes a charging control application 106, an interface 108 and a storage device 150. In the illustrated embodiment, the vehicle 103 is coupled to the vehicle charging device 133. The vehicle charging device 133 is coupled to the power utility facility 130. For example, the vehicle 103 is coupled to the vehicle charging device 133 when charging from the power utility facility 130.

Although one vehicle 103, one vehicle charging device 133 and one power utility facility 130 are illustrated in FIG. 1, persons having ordinary skill in the art will recognize that any number of vehicles 103, vehicle charging devices 133 and power utility facilities 130 can be included in the system 100.

In the illustrated embodiment, the vehicle 103 is coupled to the vehicle charging device 133 via signal line 119. The vehicle charging device 133 is coupled to the power utility facility 130 via signal line 121. The user 125 interacts with the interface 108 in the vehicle 103 as represented by signal line 117. In one embodiment, signal line 119 is an electric cable. In one embodiment, signal line 121 is a transmission line or an electric cable.

The power utility facility 130 is any facility for generating, transmitting and/or distributing electricity to consumers. The consumer is one or more factories, commercial establishments, residents or any other consumer of electricity. In one embodiment, the power utility facility 130 is a power plant for generating electricity. In another embodiment, the power utility facility 130 is a transmission tower for transmitting electricity. The electricity is any form of electricity known in the art.

The vehicle charging device 133 is any device or equipment that charges a battery. For example, the vehicle charging device 133 charges one or batteries for an electric-based vehicle such as an EV or PHV. In one embodiment, the vehicle charging device 133 provides a charging coupling for a vehicle 103. The charging coupling includes features to enable the vehicle charging device 133 to charge the battery with electricity sourced from a power supply such as an electric grid. For example, the vehicle charging device 133 is any type of electric vehicle supply equipment (EVSE). In one embodiment, the vehicle charging device 133 is a combination of two or more types EVSE.

The vehicle 103 is any electric-based vehicle. In one embodiment, the vehicle 103 is an EV. In another embodiment, the vehicle 103 is a PHV. The battery of the vehicle 103 is charged using electricity from the power utility facility 130 via the vehicle charging device 133.

In the illustrated embodiment, the vehicle 103 includes a charging control application 106, an interface 108 and a storage device 150. The interface 108 is communicatively coupled to the charging control application 106 via signal line 113. The user 125 interacts with the interface 108 as represented by signal line 117. The storage device 150 is communicatively coupled to the charging control application 106 via signal line 115.

The charging control application 106 retrieves data describing utility rate information and one or more behaviors of the vehicle 103. In one embodiment, the charging control application 106 retrieves the data from the vehicle 103 and/or the power utility associated with the power utility facility 103. The behavior of the vehicle 103 refers to a status or a routine of the vehicle 103, for example, a mileage, a departure time, etc. In one embodiment, the data describes one or more behaviors of the vehicle 103 including a mileage of the vehicle 103, a battery SoC and an ignition on (IG-ON) time.

In another embodiment, the one or more behaviors of the vehicle 103 also include a departure time and an in-home time for the vehicle 103.

The utility rate information is the information that describes electric utility rate in a certain period of time. In one embodiment, the electric utility rate such as a power utility price per unit changes dynamically in season and/or in time zone. In one embodiment, the electric utility rate changes at different times of the day. For example, rates are lower during off peak hours when compared with peak hours. The utility rate information describes the variation of the electric utility rate in a certain period of time. For example, the utility rate information includes daily electric utility rates during a certain period of time such as a week, a month, a year, etc. In other examples, the utility rate information includes an hourly, weekly, monthly or yearly electric utility rate. In one embodiment, the charging control application 106 also retrieves data describing utility generation status.

The charging control application 106 analyzes the data describing utility rate information and one or more behaviors of the vehicle 103 and estimates one or more tendency parameters based at least in part on the analyzing. The one or more tendency parameters include parameters used to calculate a charging setting for the vehicle 103. For example, the one or more tendency parameters include a daily needed SoC, a regular daily departure time, a regular daily in-home time and a daily utility rate variation. The charging control application 106 calculates the charging setting based at least in part on the one or more tendency parameters. The charging control application 106 will be described in further detail below with reference to FIG. 2.

The interface 108 is a device configured to handle communications between the user 125 and the charging control application 106. For example, the interface 108 includes one or more of an in-vehicle touch screen for receiving inputs from the user 125 and a microphone for capturing voice inputs from the user 125. The interface 108 sends the inputs from the user 125 to the charging control application 106. In one embodiment, the interface 108 is configured to transmit an output from the charging control application 106 to the user 125. For example, the interface 108 displays a charging menu to the user 125 including three charging setting modes that can be selected by the user 125. One having ordinary skill in the art will recognize that the interface 108 may include other types of devices for providing the functionality described herein.

The user 125a is a human user. In one embodiment, the user 125 is a driver driving a vehicle on a road. The user 125 interacts with, or otherwise provides an input to, an interface 108, which sends and receives different types of data to and from the charging control application 106. For example, the interface 108 is a touch screen and the user 125 touches a portion of the touch screen with a finger or a stylus to provide an input.

The storage device 150 is a non-transitory memory that stores data. For example, the storage device 150 is a dynamic random access memory (DRAM) device, a static random access memory (SRAM) device, flash memory or some other memory device known in the art. In one embodiment, the storage device 150 also includes a non-volatile memory or similar permanent storage device and media such as a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device known in the art. The storage device 150 will be described in more detail below with reference to FIG. 3.

Charging Control Application 106

Figure 2:
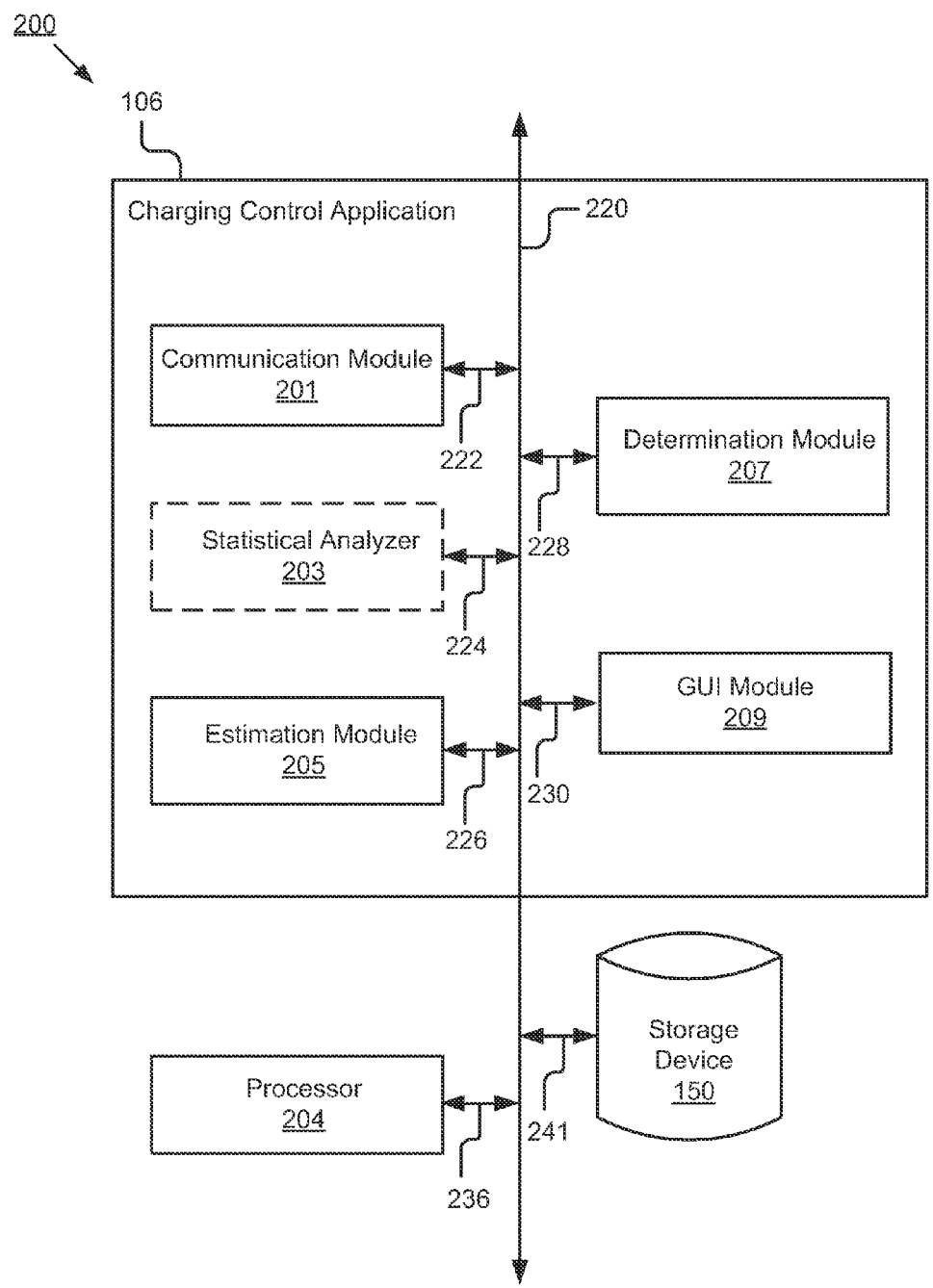
FIG. 2 is a block diagram illustrating a charging control application in detail according to one embodiment.

Referring now to FIG. 2, depicted is an embodiment 200 of the vehicle 103 including the charging control application 106 in detail. The illustrated charging control application 106 includes a communication module 201, a statistical analyzer 203, an estimation module 205, a determination module 207 and a graphical user interface (GUI) module 209. The statistical analyzer 203 is depicted using a dotted line to indicate that it is an optional element for the charging control application 106. The embodiment 200 of the vehicle 103 also includes a processor 204, a memory (not pictured) and a storage device 150. These components of the vehicle 103 are communicatively coupled to a bus 220 for communicate with one another.

In the illustrated embodiment, the communication module 201 is communicatively coupled to the bus 220 via signal line 222. The statistical analyzer 203 is communicatively coupled to the bus 220 via signal line 224. The estimation module 205 is communicatively coupled to the bus 220 via signal line 226. The determination module 207 is communicatively coupled to the bus 220 via signal line 228. The GUI module 209 is communicatively coupled to the bus 220 via signal line 230. The processor 204 is communicatively coupled to the bus 220 via signal line 236. The storage device 150 is communicatively coupled to the bus 220 via signal line 241.

The processor 204 comprises an arithmetic logic unit, a microprocessor, a general purpose controller or some other processor array to perform computations, retrieve data stored on the storage device 150, etc. The processor 204 processes data signals and may comprise various computing architectures including a complex instruction set computer (CISC) architecture, a reduced instruction set computer (RISC) architecture, or an architecture implementing a combination of instruction sets. Although only a single processor 204 is shown in FIG. 2, multiple processors 204 may be included. The processing capability of the processor 204 may be limited to supporting the display of signals and the capture and transmission of signals. The processing capability of the processor might be enough to perform more complex tasks, including various types of feature extraction and sampling. It will be obvious to one skilled in the art that other processors, operating systems, sensors, displays and physical configurations are possible.

The communication module 201 is code and routines for handling communication between components of the charging control application 106 and other components of the vehicle 103. For example, the communication module 201 receives data describing one or more behaviors from the vehicle 103. The one or more behaviors of the vehicle 103 include a mileage of the vehicle 103, a battery SoC, an IG-ON time, a departure time and an in-home time. For example, the vehicle 103 records statuses (such as a mileage, a daily highest and lowest battery SoC, a daily IG-ON time, a daily departure and in-home time) every day and provides a record of the daily statuses for a month to the communication module 201. In one embodiment, the communication module 201 transmits the data describing one or more behaviors of the vehicle 103 to the statistical analyzer 203 or the estimation module 205 (depending upon different embodiments). In another embodiment, the communication module 201 also stores the data in the storage device 150. The communication module 201 is communicatively coupled to the bus 220 via signal line 222.

In one embodiment, the communication module 201 receives data describing utility rate information from the vehicle charging device 133. For example, the vehicle charging device 133 retrieves utility rate information from the power utility and provides it to the communication module 201. The utility rate information includes an hourly, daily, weekly, monthly or yearly electric utility rate, such as a price for one kilowatt hour (kWh) electric utility. In one embodiment, the communication module 201 also receives data describing electricity generation status information from the vehicle charging device 133. The communication module 201 sends the data describing utility rate information and/or data describing electricity generation status information to the statistical analyzer 203 or the estimation module 205 (depending on different embodiments). In one embodiment, the communication module 201 also stores the data in the storage device 150.

In one embodiment, the communication module 201 receives the data periodically in a predetermined time period. For example, the communication module 201 receives the data describing utility rate information and the one or more behaviors of the vehicle 103 every day, every week, or every month. In another embodiment, the communication module 201 receives the data once the vehicle 103 is plugged in the vehicle charging device 133.

In one embodiment, the communication module 201 receives graphical data from the GUI module 209. The communication module 201 sends the graphical data to the interface 108 for displaying information to a user 125. For example, the graphical data is used to generate a user interface for displaying a charging menu to the user 125 who can select a charging setting from the charging menu. In one embodiment, the communication module 201 receives an input from a user 125 via the interface 108. For example, the input is a selection of a charging setting. The communication module 201 sends the input to the determination module 207 to control the charging based on the selection of the charging setting.

In one embodiment, the communication module 201 also handles the communications between other sub-modules 203, 205, 207 and 209 in the charging control application 106. For example, the communication module 201 communicates with the estimation module 205 and the determination module 207 to pass an output of the estimation module 205 (such as one or more tendency parameters) to the determination module 207. However, this description may occasionally omit mention of the communication module 201 for purposes of clarity and convenience. For example, for purposes of clarity and convenience, the above scenario may be described as the estimation module 205 passing an output (such as one or more tendency parameters) to the determination module 207.

The statistical analyzer 203 is code and routines for analyzing the data describing one or more behaviors of the vehicle 103 and the data describing utility rate information. For example, the statistical analyzer 203 analyzes the data on a statistical basis and obtains a statistical analysis result. The statistical analyzer 203 sends the statistical analysis result to the estimation module 205 for estimating tendency parameters. In one embodiment, the statistical analyzer 203 also stores the statistical analysis result in the storage device 150. The statistical analyzer 203 is communicatively coupled to the bus 220 via signal line 224.

The statistical analyzer 203 receives the data describing utility rate information and one or more behaviors of the vehicle 103 from the communication module 201. In one embodiment, the statistical analyzer 203 also receives data describing utility generation status. In one embodiment, the statistical analyzer 203 receives the data periodically in a predetermined period of time. In another embodiment, the statistical analyzer 203 receives the data once the vehicle 103 is plugged in the vehicle charging device 133.

Once the statistical analyzer 203 receives the data describing utility rate information and one or more behaviors of the vehicle 103, the statistical analyzer 203 analyzes the data on a statistical basis. For example, the received data describes a behavior of the vehicle 103 such as an IG-ON time. The data includes daily IG-ON times for a certain period of time such as a month. The statistical analyzer 203 uses the received data as training data to learn some properties (e.g., a probability distribution, a mean, a variation, etc.) of the daily IG-ON time via a known machine learning algorithm. The statistical analyzer 203 then sends the learned properties of the daily IG-ON time to the estimation module 205 that predicts a regular daily IG-ON time for the vehicle 103 based on the learned properties.

Similarly, for other behaviors of the vehicle 103 included in the received data such as a mileage, a battery SoC, a departure time and an in-home time, the statistical analyzer 203 learns properties from the received data (which is used as training data) and sends the learned properties to the estimation module 205 to predict regular daily behaviors of the vehicle 103 based on the learning. Furthermore, the statistical analyzer 203 also trains data describing utility rate information and transmits the training result to the estimation module 205 that estimates the changing tendency of the utility rate in a certain future period of time. In one embodiment, the statistical analyzer 203 stores the statistical analysis result in the storage device 150.

In one embodiment, the statistical analyzer 203 also retrieves previous statistical analysis results from the storage device 150 and uses the previous statistical analysis results to adjust the learned properties of the presently received data. For example, the statistical analyzer 203 receives data every month describing a behavior of the vehicle 103. The statistical analyzer 203 analyzes the current month data and adjusts the analyzing result based on a previous analyzing result for a previous month.

In one embodiment, the statistical analyzer 203 is not included in the charging control application 106. The functionalities described above with reference with the statistical analyzer 203 are performed by the estimation module 205. For example, the estimation module 205 learns properties from the retrieved data describing utility rate information and one or more behaviors of the vehicle 103 and estimates tendency parameters (e.g., a daily needed SoC, a regular daily departure time, a regular daily in-home time, a daily utility rate variation, etc.) based on the learned properties.

The estimation module 205 is code and routines for estimating one or more tendency parameters based on the analyzing upon the data describing the utility rate information and one or more behaviors of the vehicle 103. For example, the estimation module 205 receives a statistical analysis result including learned properties of the data from the statistical analyzer 203 and estimates one or more tendency parameters based on the statistical analysis result. In one embodiment, the one or more tendency parameters include a daily needed SoC, a regular daily departure time, a regular daily in-home time and a daily utility rate variation. The estimation module 205 sends the one or more tendency parameters to the determination module 207. In one embodiment, the estimation module 205 also stores the tendency parameters in the storage device 150. The estimation module 205 is communicatively coupled to the bus 220 via signal line 226.

In one embodiment, the estimation module 205 receives the statistical analysis result including properties learned from the data describing vehicle behaviors and utility rate information from the statistical analyzer 203. The estimation module 205 estimates one or more tendency parameters based at least in part on the statistical analysis result. For example, the estimation module 205 estimates a daily needed battery SoC based on one or more properties of the vehicle behaviors (such as a daily battery SoC, a mileage and a daily IG-ON time). The daily needed battery SoC refers to a battery SoC needed for a regular daily usage of the vehicle 103 such as a PHV. For example, based on the properties of the vehicle behaviors during a week or a month, the estimation module 205 estimates the daily needed battery SoC for a PHV as 5 kWh/day indicating that the PHV needs 5 kWh battery SoC for an everyday usage. In one embodiment, the daily needed battery SoC is a range of battery SoC with a highest amount and a lowest amount.

In one embodiment, the tendency parameters also include a regular daily departure time, a regular daily in-home time and a daily utility rate variation. The estimation module 205 estimates these tendency parameters based on the properties learned from the data describing vehicle behaviors and utility rate information. For example, the estimation module 205 predicts a regular weekday departure time using a mean and a variation learned from the data describing weekday departure times of the vehicle 103 during the past month. In one embodiment, these tendency parameters can be ranges with highest amounts and lowest amounts. For example, the regular weekday departure time is a range from 8 AM to 9 AM.

In one embodiment, without the statistical analyzer 203 included in the charging control application 106, the estimation module 205 analyzes the data describing vehicle behaviors and utility rate information and estimates the tendency parameters based at least in part on the analyzing. The estimation module 205 sends the tendency parameters to the determination module 207 for determining a charging setting. In one embodiment, the estimation module 205 also stores the tendency parameters in the storage device 150.

The determination module 207 is code and routines for determining a charging setting based at least in part on the one or more tendency parameters. For example, the determination module 207 determines a target charging battery SoC (e.g., a battery SoC that a vehicle 103 needs to charge everyday) for the vehicle 103 based on the tendency parameters such as a daily needed battery SoC. The determination module 207 calculates a price threshold based at least in part on the determined target charging battery SoC and the regular daily departure time. The price threshold is then used by the determination module 207 to compare to the utility rate to determine a charging start time and a charging end time. The determination module 207 is communicatively coupled to the bus 220 via signal line 228.

The determination module 207 receives the tendency parameters from the estimation module 205. For example, the tendency parameters include a daily needed battery SoC, a regular daily departure time, a regular daily in-home time and a daily utility rate variation. In one embodiment, the determination module 207 determines a target charging battery SoC based on the daily needed battery SoC. For example, the determination module 207 determines a target charging battery SoC as the same as the daily needed battery SoC such as 80% of the full battery capacity.

In one embodiment, the determination module 207 determines three modes of charging and determines a target charging battery SoC for each mode of charging. For example, the determination module 207 determines an aggressive mode, a medium mode and a conservative (moderate) mode of charging. The aggressive mode indicates charging at a lower utility price and that the vehicle 103 will have a relatively small margin for its battery SoC. The medium mode indicates charging the vehicle 103 at a balance of the battery SoC and the cost of charging. The conservative mode indicates charging the vehicle battery to achieve a higher battery SoC and that the cost of charging will be higher than the costs for the previously described two modes.

The determination module 207 determines a target charging battery SoC for each of the aggressive mode, the medium mode and the conservative mode. For example, the determination module 207 determines the target charging battery SoCs for the three modes based on the estimated daily needed battery SoC. For an aggressive mode, the determination module 207 determines the target charging battery SoC as with a small margin, e.g., the target charging battery SoC for the aggressive mode is determined as 100% of the estimated daily needed battery SoC (such as 5 kWh). The determination module 207 determines the target charging battery SoC for the medium mode as 105% of the estimated daily needed battery SoC (such as 5.25 kWh) and the target charging battery SoC for the conservative mode as 110% of the estimated daily needed battery SoC (5.5 kWh).

In one embodiment, the determination module 207 determines different regular daily departure times for different modes of charging based on the estimated regular daily departure time. For example, the regular daily departure time for an aggressive mode has a smaller margin; for a medium mode, the regular daily departure time has a balanced margin; for a conservative mode, the daily regular departure time has a larger margin. Accordingly, for example, if the estimated regular daily departure time is 8 AM, the determination module 207 determines the regular daily departure time for the aggressive mode, the medium mode and the conservative mode as 8:00 AM, 7:30 AM and 7:00 AM, respectively.

In one embodiment, the determination module 207 calculates a price threshold based at least in part on the determined target charging battery SoC, the determined regular daily departure time and in-home time and the daily utility rate variation. The price threshold will be later used to compare with the electric utility price to determine a charging time period during which the electric utility price is below the price threshold. The charging time period is before the determined regular daily departure time and within the regular daily in-home time. By charging during the charging time period, the vehicle 103 gains the target charging battery SoC for its battery. Accordingly, the determination module 207 calculates the price threshold to guarantee that the vehicle 103 is charged the target charging battery SoC before the regular daily departure time and/or within the regular daily in-home time. By comparing the price threshold to an electric utility price, the determination module 205 determines a charging start time and a charging end time.

In one embodiment, the determination module 207 calculates a price threshold for each of the three modes of charging. Since the determination module 207 determines different target charging battery SoCs and/or different regular daily departure times for different modes of charging, the determination module 207 calculates different price thresholds for different modes based on the different target charging battery SoCs and/or the different regular daily departure times. For example, the target charging battery SoC and the regular daily departure time for the aggressive mode have smaller margins and therefore the determination module 207 calculates a relatively low price threshold for the aggressive mode. In contrast, the price thresholds for the medium mode and conservative mode are medium and relatively high respectively.

In one embodiment, the determination module 207 provides the charging setting including the three modes to a user 125 via the interface 108. For example, the determination module 207 sends information describing the three modes (e.g., an aggressive mode, a medium mode, a conservative mode) to the GUI module 311 that generates a user interface describing the three modes and provides the user interface to a user 125 via the interface 108. In one embodiment, the determination module 207 receives a selection of the three modes from the user 125 via the interface 108. For example, the determination module 207 receives a selection of a medium mode from the user 125. The determination module 207 establishes the charging setting for the vehicle 103 based on the selection of the user 125 and controls charging the vehicle 103 based on the charging setting.

In one embodiment, the determination module 207 receives a change of the charging setting from a user 125 via the interface 108. For example, when a user 125 inputs a target charging battery SoC or a charging end time for each day in the next week, the determination module 207 receives the input about the charging setting and determines if the input of the charging setting is different from the already determined charging setting. If they are different, the determination module 207 calculates a new price threshold based on the input of change of the charging setting and thus a new charging start time and a new charging end time. The determination module 207 then controls the charging of the vehicle 103 based on the new charging start time and the new charging end time.

The GUI module 209 is code and routines for providing graphical data for a user 125. The GUI module 209 is communicatively coupled to the bus 220 via signal line 230. In one embodiment, the GUI module 209 generates graphical data for depicting a user interface to display information to a user 125. In other embodiments, the GUI module 209 generates graphical data for depicting a user interface by which a user 125 inputs information to the charging control application 106. The GUI module 209 sends the generated graphical data to the interface 108, causing the interface 108 to present the user interface to the user 125.

Storage Device 150

Figure 3:
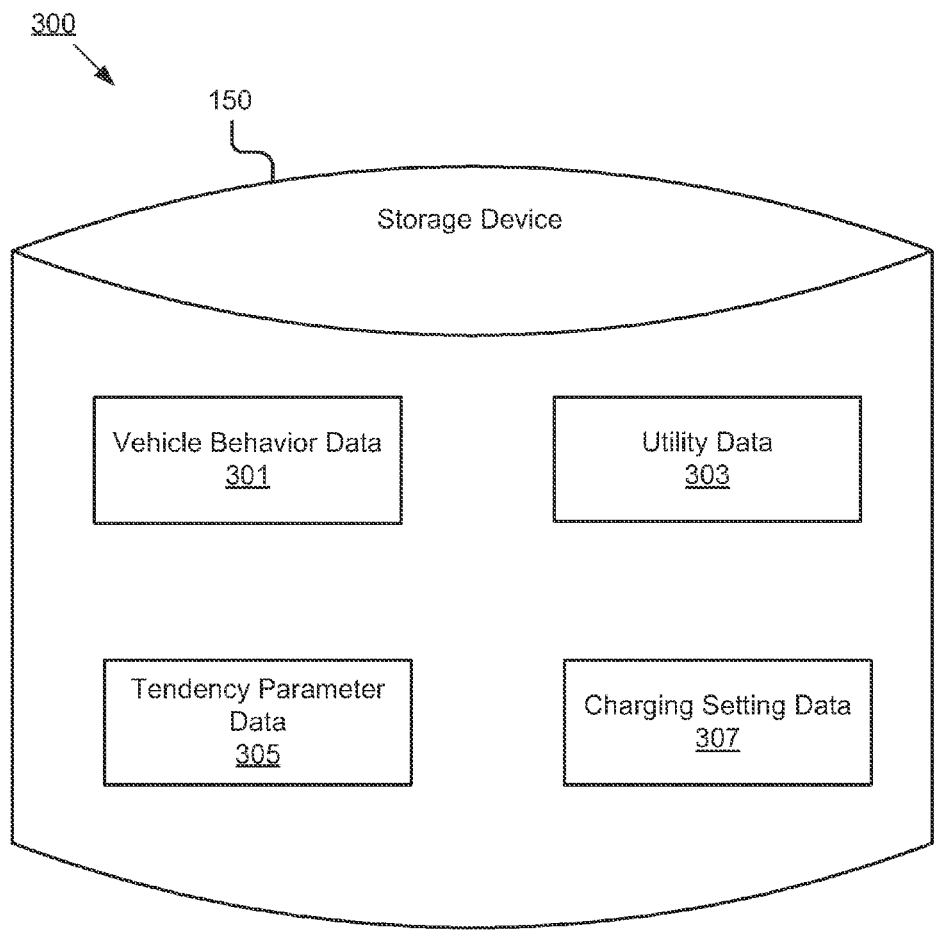
FIG. 3 is a block diagram illustrating a storage device according to one embodiment.

FIG. 3 is a block diagram 300 illustrating a storage device 150 according to one embodiment. The storage device 150 includes vehicle behavior data 301, utility data 303, tendency parameter data 305 and charging setting data 307. One skilled in the art will recognize that the storage device 150 may include other data for providing the functionality described herein.

The vehicle behavior data 301 is data describing one or more behaviors of the vehicle 103. In one embodiment, the one or more behaviors include a mileage of the vehicle 103, a battery SoC, an IG-ON time, a departure time and an in-home time of the vehicle 103. The communication module 201 receives the vehicle behavior data 301 from the vehicle 103 and transmits the vehicle behavior data 301 to the statistical analyzer 203 or the estimation module 205 (depending upon different embodiments). The communication module 201 also stores the vehicle behavior data 301 in the storage device 150.

The utility data 303 is data describing utility rate information and other utility information such as a generation status. The utility rate information describes electric utility rate variation during a certain period of time. For example, the utility rate information includes daily electric utility rates during a week, a month or a year. In another embodiment, the utility rate information includes hourly electric utility price using a day. In one embodiment, the communication module 201 receives utility data 303 from the power utility via the vehicle charging device 133. The communication module 201 transmits the utility data 303 to the statistical analyzer 203 or the estimation module 205 (depending on different embodiments). The communication module 201 also stores the utility data 303 in the storage device 150.

The tendency parameter data 305 includes one or more parameters used to calculate a charging setting for the vehicle 103. In one embodiment, the tendency parameters include a daily needed SoC, a regular daily departure time, a regular daily in-home time and a daily utility rate variation. In one embodiment, the estimation module 205 estimates the one or more tendency parameters based on statistical analyzing of the vehicle behavior data 301 and the utility data 303. The estimation module 205 sends the one or more tendency parameters to the determination module 207. The estimation module 205 also stores the tendency parameter data 305 in the storage device 150.

The charging setting data 307 is data describing one or more charging settings for the vehicle 103. For example, a charging setting includes a target charging battery SoC, a charging start time and a charging end time. In one embodiment, the charging setting data 307 describes three modes of charging. For example, the three modes of charging include an aggressive mode, a medium mode and a conservative (moderate) mode and each mode indicates a different target charging battery SoC, a different charging start time and a different charging end time. In one embodiment, the determination module 207 determines a charging setting based on the tendency parameters sent from the estimation module 205. The determination module 207 determines a target charging battery SoC based on the tendency parameters and calculates a price threshold based at least in part on the determined target charging battery SoC and tendency parameters. By comparing the price threshold to the electric utility price, the determination module 207 determines a charging start time and a charging end time.

In one embodiment, the determination module 207 provides the one or more charging settings to a user 125 via the interface 108. The determination module 207 receives a selection of the charging settings from the user 125 and sets up the charging setting for the vehicle 103 based on the selection from the user 125. In another embodiment, the determination module 207 receives a change of the charging setting from the user 125. The determination module 207 controls the charging of the vehicle 103 based on the change of the charging setting.

Methods

Figure 4:
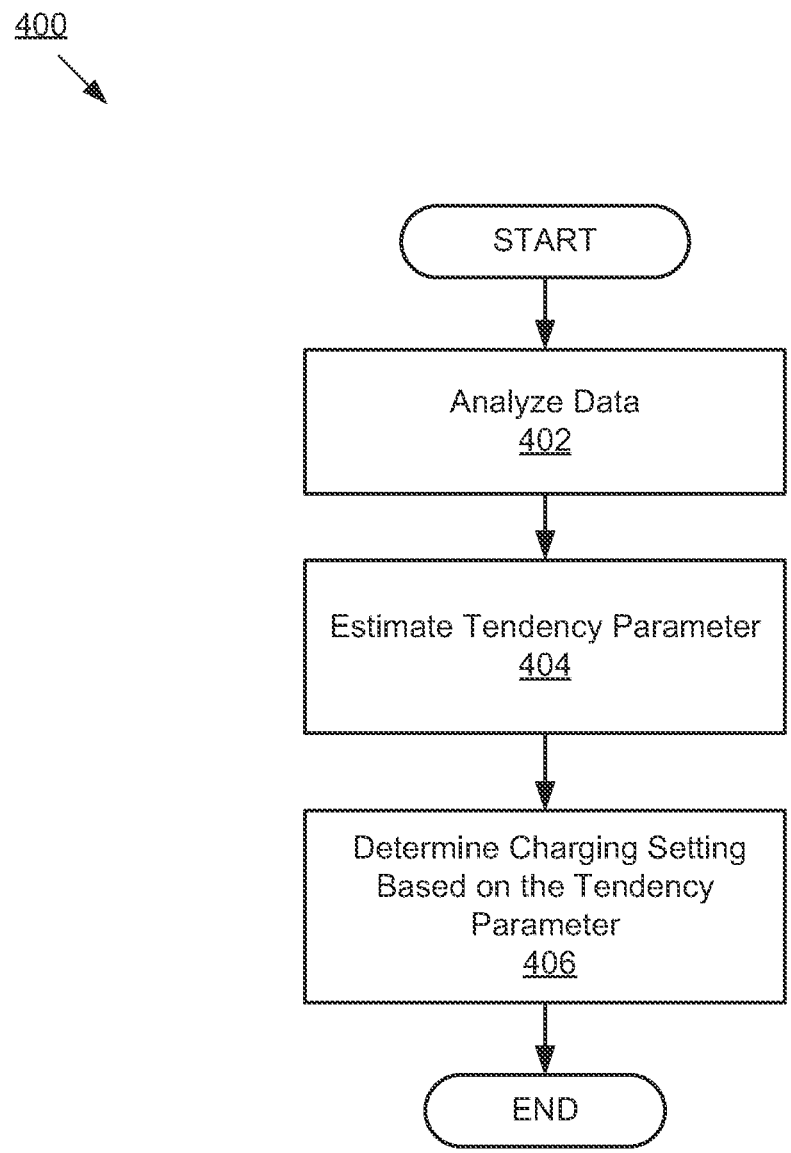
FIG. 4 is a flow diagram illustrating a method for controlling charging for a vehicle according to one embodiment.
Figure 5A:
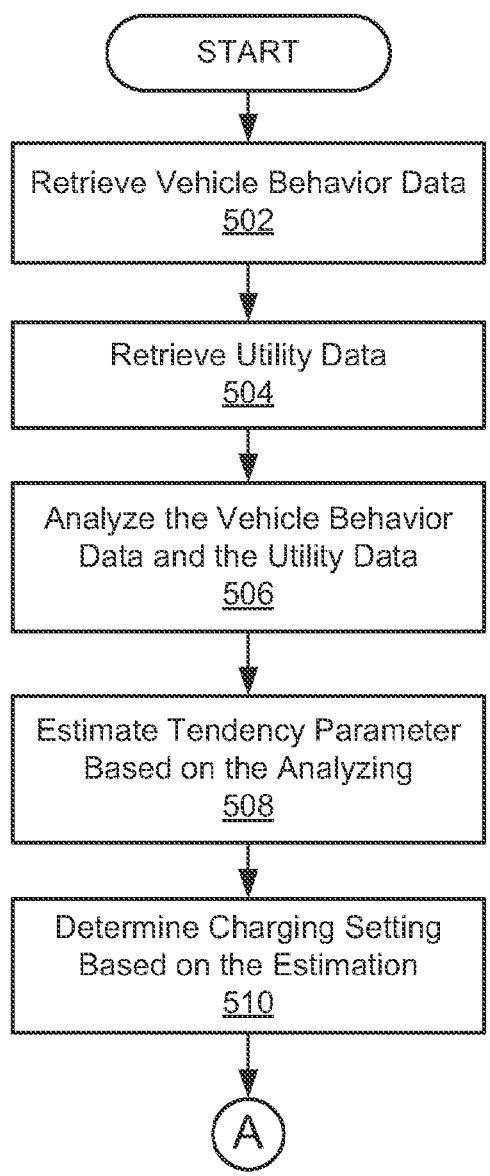
FIGS. 5A-5B are flow diagrams illustrating a method for controlling charging for a vehicle according to another embodiment.
Figure 5B:
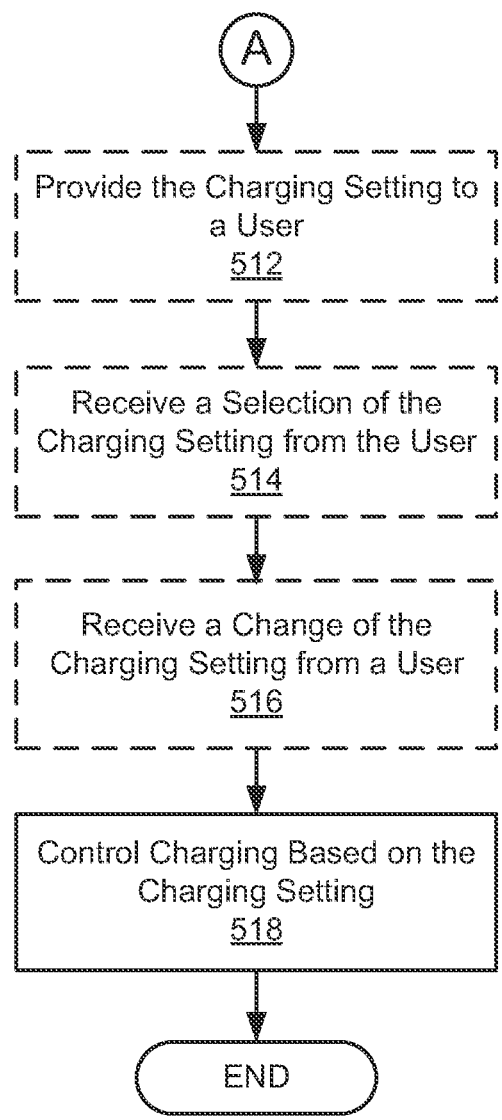

Referring now to FIGS. 4-5B, various embodiments of the method of the specification will be described.

FIG. 4 is a flow diagram illustrating a method 400 for controlling charging for a vehicle according to one embodiment. The statistical analyzer 203 analyzes 402 data describing utility rate information and one or more behaviors of the vehicle 103. For example, the statistical analyzer 203 analyzes the data on a statistical basis and obtains a statistical analysis result. In one embodiment, without a statistical analyzer 203 included in the charging control application 106, the estimation module 205 analyzes the data describing utility rate information and one or more behaviors of the vehicle 103.

At step 404, the estimation module 205 estimates one or more tendency parameters based at least in part on the analyzing of the data describing utility rate information and one or more behaviors of the vehicle 103. In one embodiment, the one or more tendency parameters include a daily needed SoC, a regular daily departure time, a regular daily in-home time and a daily utility rate variation. For example, based on the analyzing of the vehicle behaviors, the estimation module 205 estimates the daily needed battery SoC for the vehicle 103 such as a PHV. The estimation module 205 also estimates the regular daily departure time and/or the regular daily in-home time based at least in part on the analyzing of the vehicle behaviors. The estimation module 205 estimates the daily utility rate variation based on the analyzing of the data describing utility rate information.

At step 406, the determination module 207 determines one or more charging settings based on the tendency parameters. In one embodiment, the charging setting includes a target charging battery SoC, a charging start time and a charging end time. For example, the determination module 207 determines a target charging battery SoC for the vehicle 103 based on the tendency parameters such as a daily needed battery SoC. The determination module 207 calculates a price threshold based at least in part on the determined target charging battery SoC and the tendency parameters such as the regular daily departure time. The determination module 207 then compares the price threshold to the utility rate to determine the charging start time and the charging end time. In one embodiment, the determination module 207 controls the charging of the vehicle 103 based on the charging setting.

FIG. 5A-5B are flow diagrams illustrating a method 500 for controlling charging for a vehicle according to another embodiment. The communication module 201 retrieves 502 vehicle behavior data from the vehicle 103. For example, the vehicle 103 keeps recording everyday statuses (such as a mileage, a daily highest and lowest battery SoC, a daily IG-ON time, a daily departure and in-home time). The communication module 201 retrieves a record of the daily statuses from the vehicle 103 periodically in a predetermined period of time such as every day, every week or every month. The communication module 201 sends the vehicle behavior data to the statistical analyzer 203 or the estimation module 205 (depending upon different embodiments).

At step 504, the communication module 201 retrieves utility data from the vehicle charging device 133. For example, the vehicle charging device 133 retrieves utility rate information from the power utility and provides it to the communication module 201. The utility data includes an hourly, daily, weekly, monthly or yearly electric utility rate. The communication module 201 sends the utility data to the statistical analyzer 203 or the estimation module 205 (depending upon different embodiments).

At step 506, the statistical analyzer 203 analyzes the vehicle behavior data and the utility data. For example, the statistical analyzer 203 analyzes the data on a statistical basis and obtains a statistical analysis result. The statistical analyzer 203 uses the vehicle behavior data and the utility data as training data to learn some statistical properties via a machine learning algorithm. The statistical analyzer 203 sends the learned properties of the training data to the estimation module 205. In one embodiment, the statistical analyzer 203 is not included in the charging control application 106 and the estimation module 205 analyzes the vehicle behavior data and the utility data on a statistical basis.

At step 508, the estimation module 205 estimates one or more tendency parameters based on the analyzing of the vehicle behavior data and utility data. For example, the estimation module 205 receives a statistical analysis result including learned properties of the vehicle behavior data and utility data from the statistical analyzer 203. The estimation module 205 estimates one or more tendency parameters based at least in part on the statistical analysis result. In one embodiment, the one or more tendency parameters include one or more of a daily needed battery SoC, a regular daily departure time, a regular daily in-home time and a daily utility rate variation. The estimation module 205 sends the one or more estimated tendency parameters to the determination module 207.

At step 510, the determination module 207 determines one or more charging settings based on the estimation. For example, the determination module 207 determines a target charging battery SoC for the vehicle 103 based on the estimated tendency parameters such as the daily needed battery SoC. The determination module 207 calculates a price threshold based at least in part on the determined target charging battery SoC and the regular daily departure time. The determination module 207 then compares the price threshold to the electric utility price to determine a charging start time and a charging end time. In one embodiment, the charging setting includes three modes of charging that includes an aggressive mode, a medium mode and a conservative mode. Each mode indicates a different target charging battery SoC and a different price threshold and therefore a different charging start time and a different charging end time.

Referring now to FIG. 5B, at step 512, the determination module 207 provides the charging setting to a user 125 via the interface 108. For example, the determination module 207 sends information describing the three modes of charging (e.g., an aggressive mode, a medium mode, a conservative mode) to the GUI module 311 that generates a user interface describing the three modes of charging and provides the user interface to a user 125 via the interface 108. This step 512 is depicted using a dotted line in the FIG. 5B to indicate that step 512 is an optional step for the method 500.

At step 514, the determination module 207 receives a selection of one of the three charging modes from the user 125. For example, the determination module 207 receives a selection of an aggressive mode from the user 125. The determination module 207 establishes the charging setting for the vehicle 103 based on the selection of the user 125. This step 514 is depicted using a dotted line in the FIG. 5B to indicate that step 514 is an optional step for the method 500. Accordingly, in one embodiment, the determination module 207 does not receive any user selection of the charging setting, but uses a default choice of the charging setting to charge the vehicle 103. For example, the default choice of the charging setting is the medium mode of charging.

At step 516, the determination module 207 receives a change of the charging setting from a user 125 via the interface 108. For example, when a user 125 inputs a target charging battery SoC and/or a charging end time for each day in the next week, the determination module 207 receives the input and determines if the input target charging battery SoC and/or the charging end time are different from those in the already determined charging setting. If they are different, the determination module 207 calculates a new price threshold based on the input and thus a new charging start time and a new charging end time. This step 516 is depicted using a dotted line in the FIG. 5B to indicate that step 516 is an optional step for the method 500. Accordingly, in one embodiment, the determination module 207 does not receive any change of charging setting from a user 125.

At step 518, the determination module 207 controls charging of the vehicle 103 based on the charging setting. For example, the determination module 207 starts the charging of the vehicle 103 at the charging start time and stops the charging of the vehicle 103 at the charging end time. The determination module 207 also detects the battery SoC periodically such as every hour to determine if the target charging battery SoC has been reached.

PHV and EV Comparison

FIG. 6 shows a table illustrating a comparison between PHV and EV according to one embodiment. Rows 602, 604, 606, 608, 610 include descriptions for PHV and EV as well as conclusions based upon comparing the descriptions for PHV and EV. For example, according to the descriptions in row 602, even if the battery for a PHV runs out, the PHV still has a combustion engine available to provide energy for the drive train. By comparison, since the EV does not have a combustion engine, running out of energy is fatal for the EV. This problem is compounded for the EV because the amount of time it takes to charge the EV and because in some situations a EVSE might not be available. Therefore, a conclusion is that more speculative control should be available for a PHV since, in one embodiment, the SoC requirement for charging for a PHV is not necessarily 100% of the full battery capacity.

In row 604, battery capacities are compared between PHV and EV. For example, the battery capacity of a PHV is one fifth of that of an EV. For example, the battery capacity for a PHV Prius is 5.2 kWh and a normal Prius battery capacity is 1.3 kWh. However, the battery capacity of an EV is much larger than that of a PHV. For example, the battery capacities for some EVs are 24 kWh and 16 kWh. Thus, a conclusion has been reached that since a PHV has a smaller battery capacity, it might be able to take advantage of the cheaper power supply more effectively.

Based on the descriptions in row 606, a PHV should run as an EV with battery to take advantage of the specification of the PHV since a hybrid vehicle (HV) is much cost-effective than a PHV in a HV mode. Driving by electricity is essential for an EV. So running as an EV is preferable for a PHV, but it needs to optimize the cost-performance balance.

In row 608, a comparison of a fast direct current (DC) charger between these two types of vehicles is shown. A PHV will not be equipped with a fast DC charger, whereas most EVs are equipped with fast DC chargers due to the large battery capacity. Therefore, generally a PHV will be charged at home or at office because charging will take some time and charging away from home or office will not be suitable.

Based on the descriptions in row 610, HV will be transferred to PHV and PHV gains much more popularity. For example, the number of cumulative shipments of PHV Prius is over 1 million by April, 2011. However, EV is not estimated to gain huge popularity regarding the limited EVSE infrastructure dissemination. Therefore, Toyota will deploy much more PHV lineups for more car lines.

Charging Scenarios

Figure 7A:
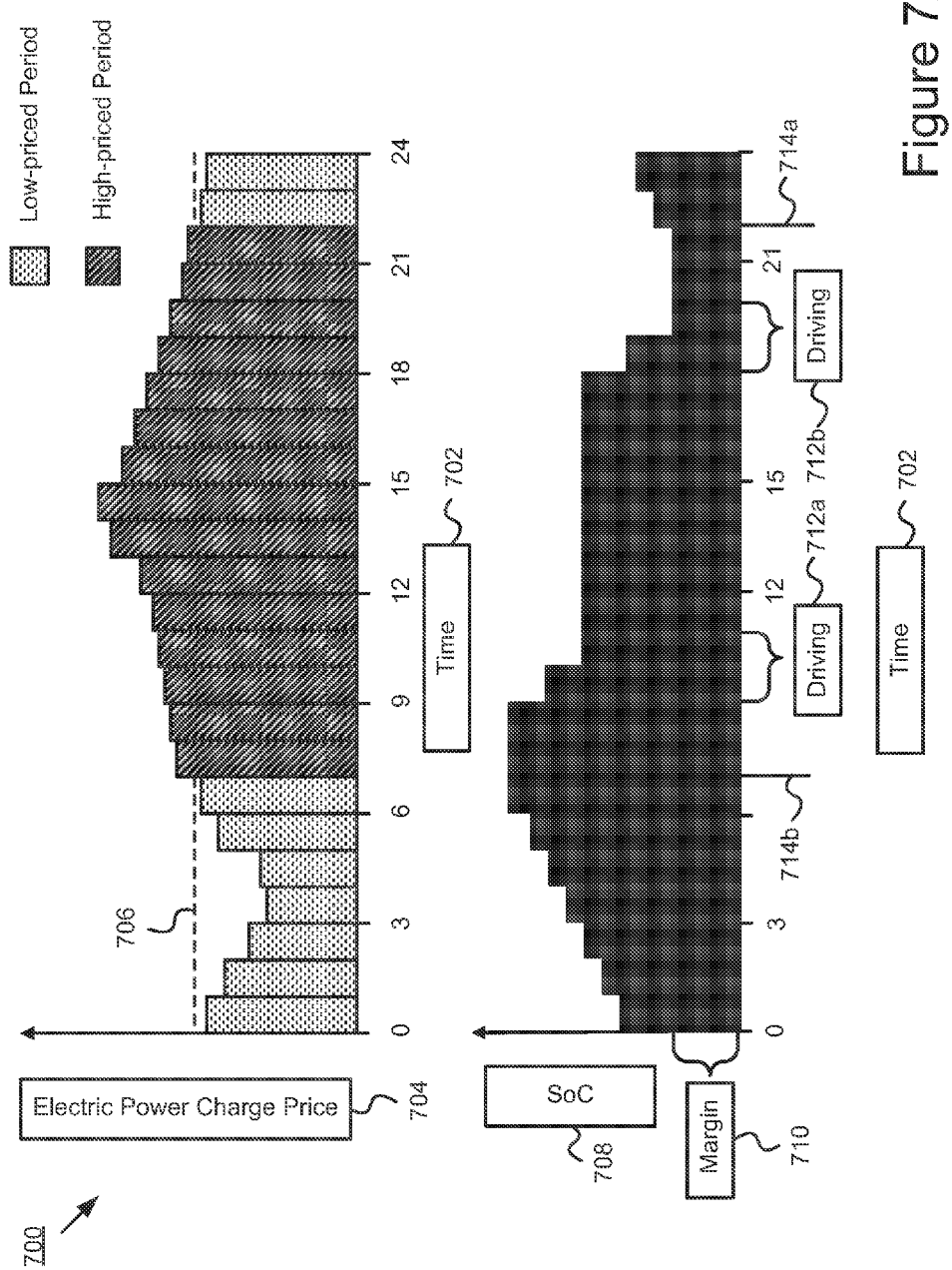
FIGS. 7A-7B are charts illustrating hourly electric power charge prices during a day and corresponding battery SoCs for EV and PHV according to one embodiment.
Figure 7B:
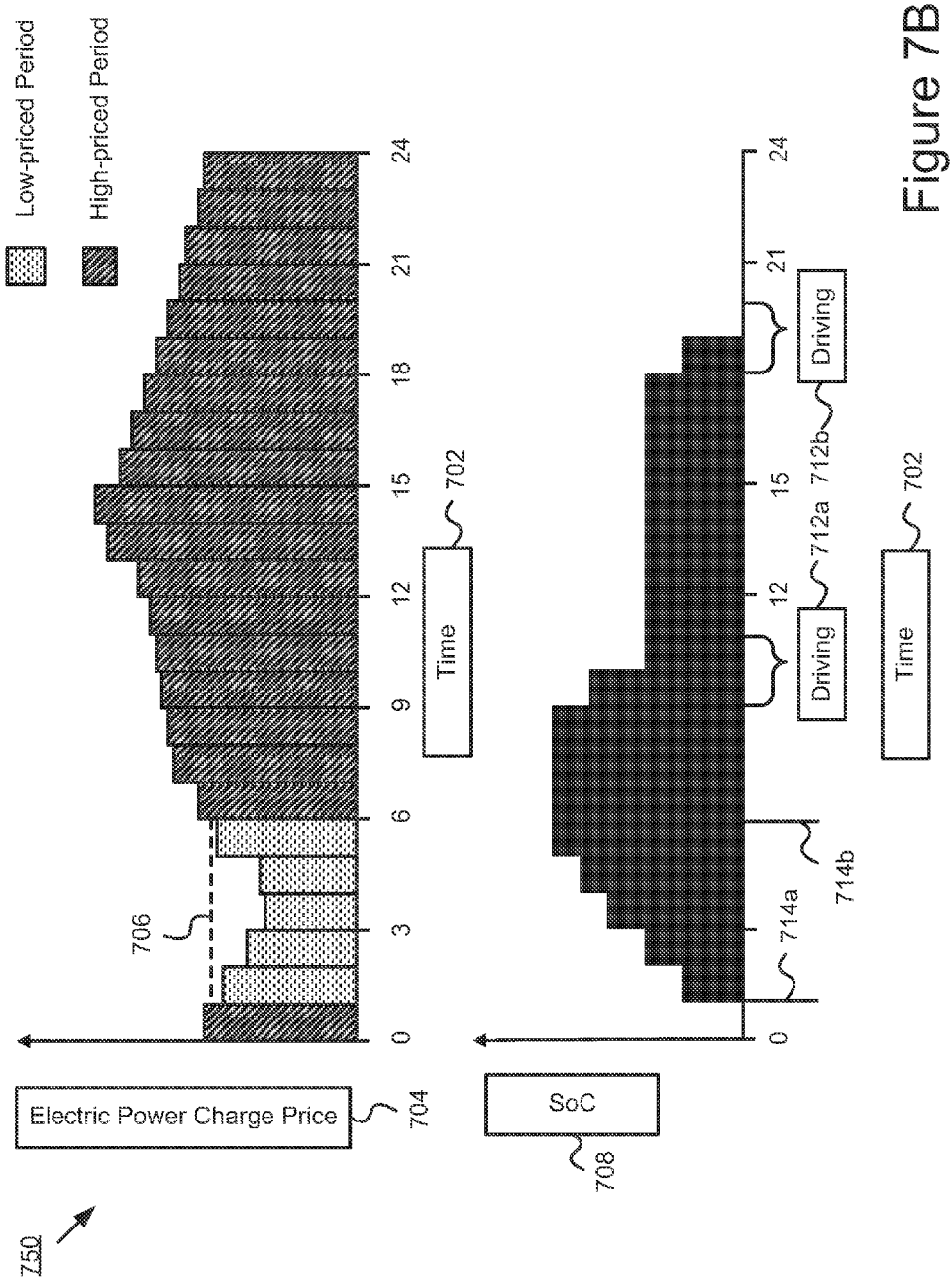

FIGS. 7A-7B are charts illustrating hourly electric power charge prices during a day and corresponding battery SoCs for EV and PHV according to one embodiment.

Referring to FIG. 7A, depicted are two charts 700 illustrating hourly electric power charge prices during a day and corresponding battery SoCs for an EV according to one embodiment. The upper chart 700 includes an x-axis 702 which represents the time during a day and a y-axis 704 representing the hourly electric power charge price during the day. The upper chart 700 also includes a line 706 representing a price threshold used to determine a low-priced period and a high-priced period. For example, the hours during the day at which the electric power charge price is lower than the price threshold 706 are determined as a low-priced period; whereas the hours at which the electric power charge price is higher than the price threshold 706 are determined as a high-priced period. In the illustrated embodiment, the time period after 22 PM and before 7 AM is a low-priced period and the time period after 7 AM and before 22 PM is a high-priced period.

The lower chart 700 includes an x-axis 702 which represents the time during a day and a y-axis 708 representing the battery SoC for the EV. Since an EV needs to keep a certain amount of margin 710 for its battery SoC, charging even with a relatively high electricity price should be needed. The lower chart 700 includes two driving periods 712a, 712b and a charging time period starting from time 714a and ending at time 714b. For example, the two driving periods 712a, 712b are determined based on the departure time and the in-home time. The charging time period from 714a to 714b is the same as the low-priced period and is determined by the price threshold 706.

During the driving periods 712a, 712b, the battery SoC for the EV decreases; during the charging time period from 714a to 714b, the battery SoC increases. The EV needs to be charged enough battery SoC to keep the margin, e.g., to guarantee that the battery SoC will not be lower than the margin 710 even after driving.

Referring to FIG. 7B, depicted are two charts 750 illustrating hourly electric power charge prices during a day and corresponding battery SoCs for a PHV according to one embodiment. The upper chart 750 includes an x-axis 702 which represents the time during a day and a y-axis 704 representing the hourly electric power charge price during the day. The upper chart 750 also includes a line 706 representing a price threshold used to determine a low-priced period and a high-priced period in the same manner as depicted in the upper chart 700 in FIG. 7A. Since a PHV does not need to keep a margin of the battery SoC and its battery capacity is smaller, charging at an as high electric power price as the price for an EV might be inadvisable and thus the price threshold 706 for a PHV is lower than that for an EV.

The lower chart 750 includes an x-axis 702 which represents the time during a day and a y-axis 708 representing the battery SoC for the PHV. Similarly, the lower chart 750 includes two driving periods 712a, 712b and a charging time period starting from time 714a and ending at time 714b. Since the price threshold 706 is lower than that for the EV depicted in FIG. 7A, the charging time period from 714a to 714b (same as the low-priced period) for the PHV is shorter than the charging time period for the EV.

Figure 8A:
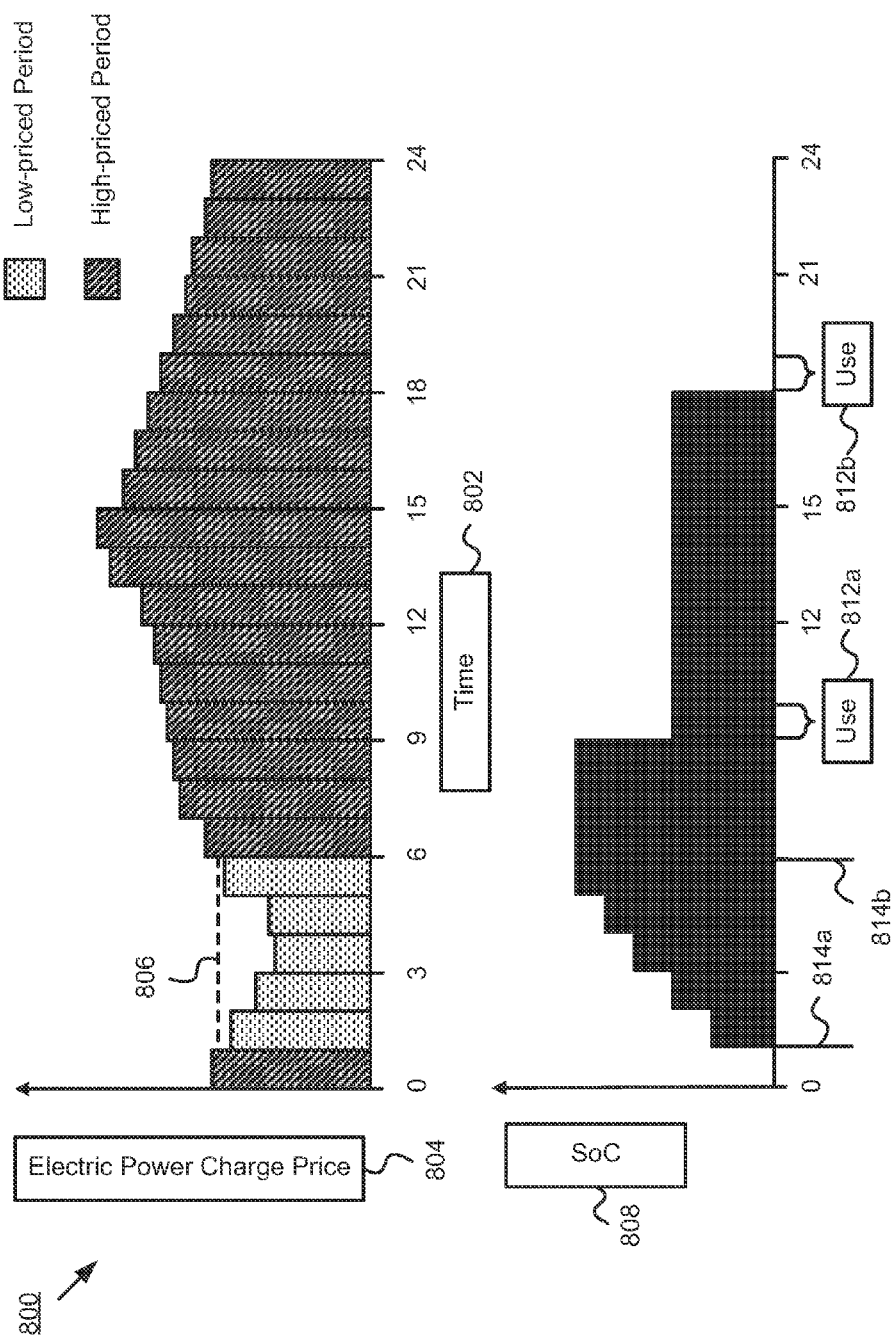
FIGS. 8A-8C are charts illustrating hourly electric power charge prices during a day and corresponding battery SoCs for PHV in three modes of charging according to one embodiment.
Figure 8B:
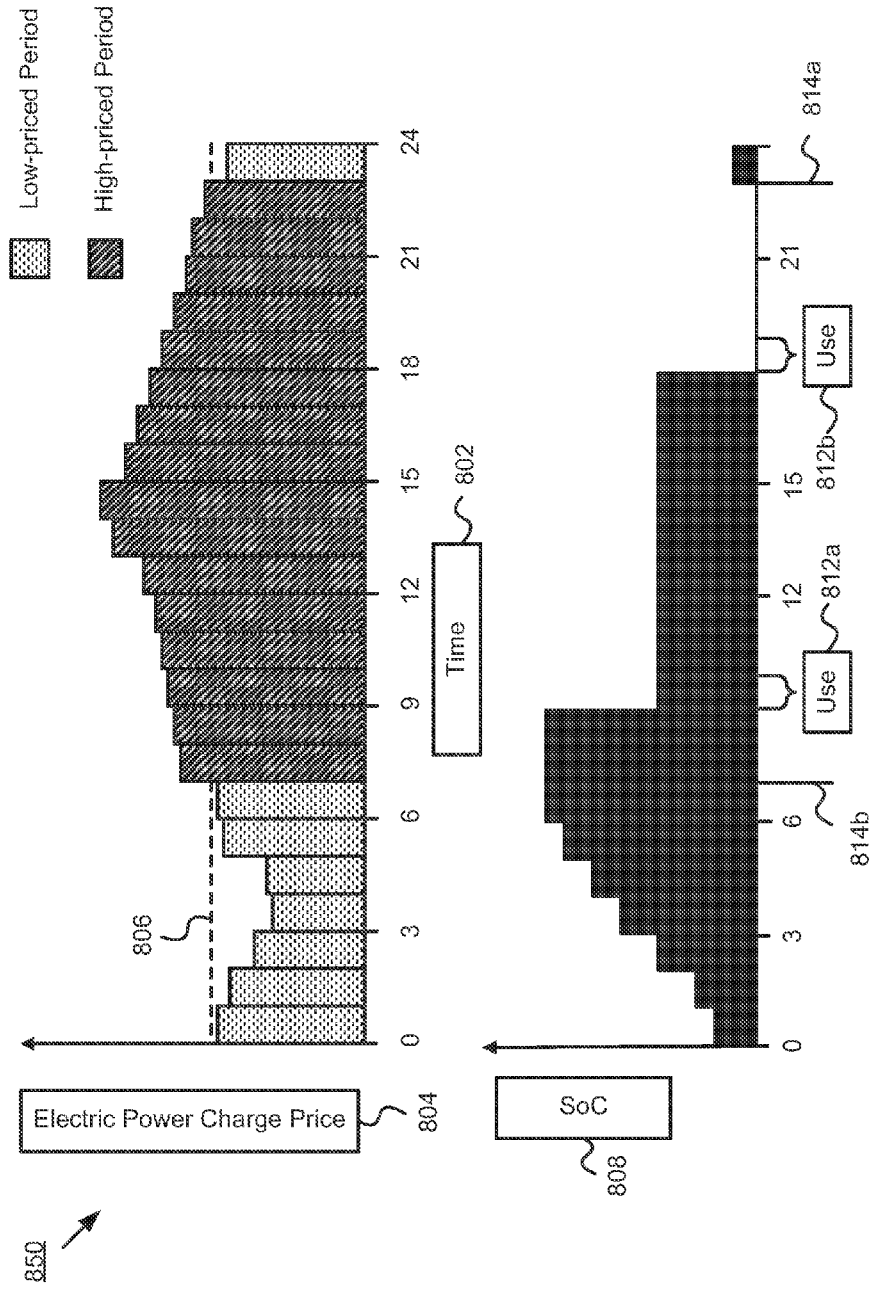
Figure 8C:
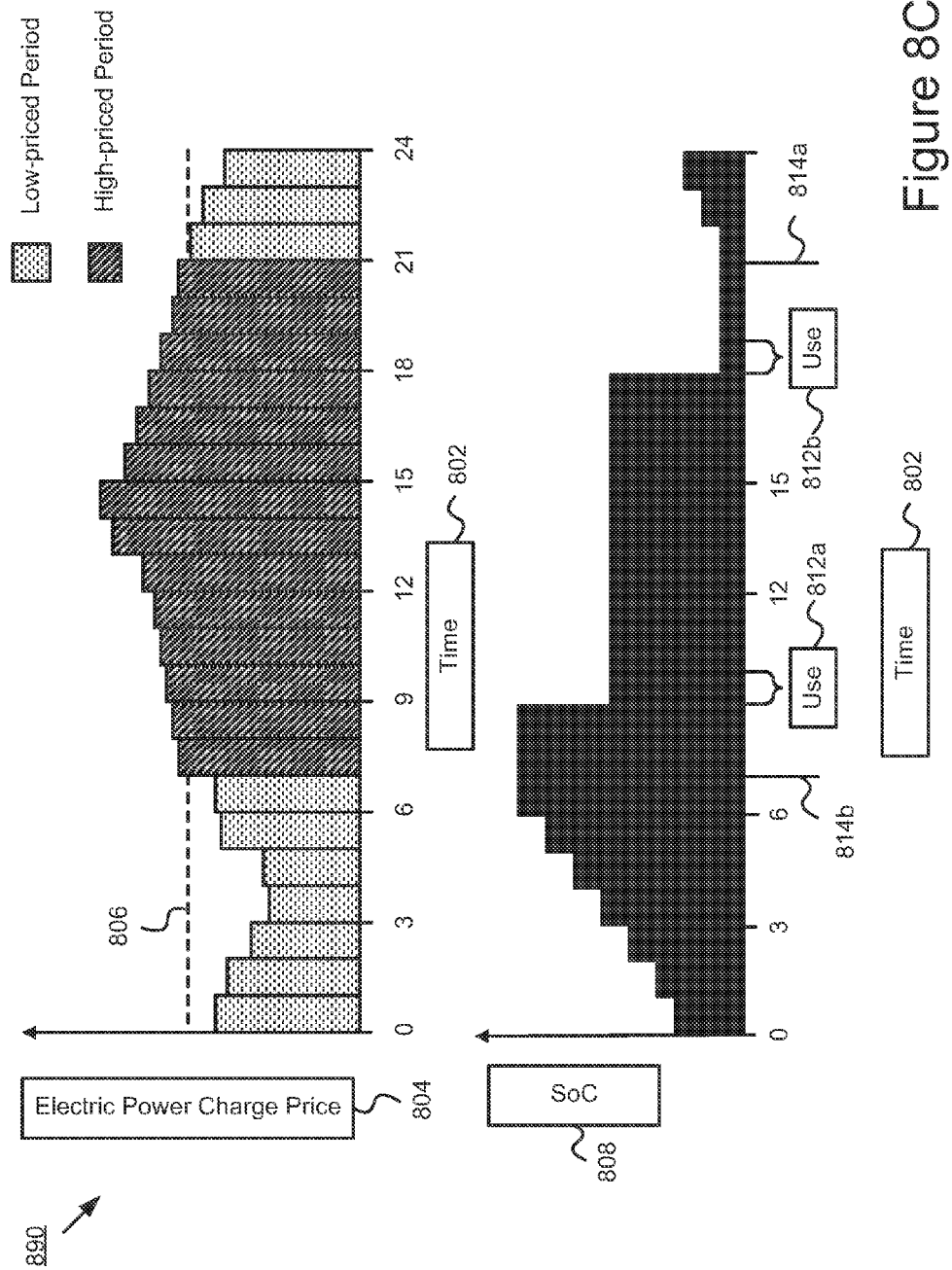

FIGS. 8A-8C are charts illustrating hourly electric power charge prices during a day and corresponding battery SoCs for PHV in three modes of charging according to one embodiment.

Referring to FIG. 8A, depicted are two charts 800 illustrating hourly electric power charge prices during a day and corresponding battery SoCs for a PHV in an aggressive charging mode according to one embodiment. The upper chart 800 includes an x-axis 802 which represents the time during a day and a y-axis 804 representing the hourly electric power charge price during the day. The upper chart 800 includes a line 806 representing a price threshold used to determine a low-priced period and a high-priced period. In the illustrated embodiment, since the PHV is charged in an aggressive charging mode, the price threshold 806 is relatively low.

The lower chart 800 includes an x-axis 802 which represents the time during a day and a y-axis 808 representing the battery SoC for the PHV. The lower chart 800 includes two driving periods 812a, 812b and a charging time period starting from time 814a and ending at time 814b. In the illustrated embodiment, the charging time period is the same as the low-priced period determined by the price threshold 806, which is from 1 AM 814a to 6 AM 814b.

Referring to FIG. 8B, depicted are two charts 850 illustrating hourly electric power charge prices during a day and corresponding battery SoCs for a PHV in a medium charging mode according to one embodiment. The upper chart 850 includes an x-axis 802 which represents the time during a day and a y-axis 804 representing the hourly electric power charge price during the day. The upper chart 850 includes a line 806 representing a price threshold used to determine a low-priced period and a high-priced period. In the illustrated embodiment, since the PHV is charged in a medium charging mode indicating a balance between the target charging battery SoC and the cost of charging, the price threshold 806 is medium.

The lower chart 850 includes an x-axis 802 which represents the time during a day and a y-axis 808 representing the battery SoC for the PHV. The lower chart 850 includes two driving periods 812a, 812b and a charging time period starting from time 814a and ending at time 814b. In the illustrated embodiment, the charging time period is the same as the low-priced period determined by the price threshold 806, which is from 23 PM 814a to 7 AM 814b. Note that the charging time period from 814a to 814b for the PHV in a medium charging mode is longer than that in an aggressive charging mode.

Referring to FIG. 8C, depicted are two charts 890 illustrating hourly electric power charge prices during a day and corresponding battery SoCs for a PHV in a conservative charging mode according to one embodiment. The upper chart 890 includes an x-axis 802 which represents the time during a day and a y-axis 804 representing the hourly electric power charge price during the day. The upper chart 890 includes a line 806 representing a price threshold used to determine a low-priced period and a high-priced period. In the illustrated embodiment, since the PHV is charged in a conservative charging mode, the price threshold 806 is relatively high.

The lower chart 890 includes an x-axis 802 which represents the time during a day and a y-axis 808 representing the battery SoC for the PHV. The lower chart 890 includes two driving periods 812a, 812b and a charging time period starting from time 814a and ending at time 814b. The charging time period is the same as the low-priced period determined by the price threshold 806, which is from 21 PM 814a to 7 AM 814b. Note that the charging time period from 814a to 814b for the PHV in a conservative charging mode is longer than that in a medium charging mode and even longer than that in an aggressive charging mode.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method for controlling charging for a vehicle, the method comprising:
   receiving from the vehicle a record reflecting a driving routine of the vehicle over a period of time, the record including departure times of the vehicle and times of the vehicle spent in-home;
   analyzing the departure times of the vehicle and the times of the vehicle spent in-home to determine one or more probabilities associated with the departure times and the times spent in-home;
   estimating one or more tendency parameters based at least in part on the probabilities associated with the departure times and the times spent in-home, each of the one or more tendency parameters reflecting an estimation for a regular daily driving behavior of the vehicle; and
   determining a charging setting based at least in part on the one or more tendency parameters, the charging setting comprising a target state of charge (SoC) for a battery.

2. The method of claim 1, wherein the vehicle is a plug-in hybrid vehicle.

3. The method of claim 1, wherein the record further includes one or more a mileage, a battery SoC, and an ignition on (IG-ON) time.

4. The method of claim 1, wherein the one or more tendency parameters include one or more of a regular daily departure time, a regular daily in-home time, and a daily needed battery SoC.

5. The method of claim 1, wherein the charging setting comprises one or more of an aggressive mode with a threshold, a medium mode with a threshold that is higher than the threshold of the aggressive mode, and a conservative mode with a threshold that is higher than the threshold of the medium mode.

6. The method of claim 5 further comprising controlling charging for the vehicle by comparing the threshold with utility rate information.

7. The method of claim 6, wherein the utility rate information describes an electric utility rate for a certain period of time.

8. The method of claim 1 further comprising:
   providing the charging setting to a user of the vehicle; and
   responsive to receiving a selection of the charging setting from the user, controlling charging for the vehicle based at least in part on the selection of the charging setting.

9. The method of claim 1 further comprising:
   receiving a change of the charging setting from a user of the vehicle; and
   controlling charging for the vehicle based at least in part on the change of the charging setting.

10. A system for controlling charging for a vehicle, the system comprising:
    a communication module for receiving from the vehicle a record reflecting a driving routine of the vehicle over a period of time, the record including departure times of the vehicle and times of the vehicle spent in-home;

a statistical analyzer for analyzing the departure times of the vehicle and the times of the vehicle spent in-home to determine one or more probabilities associated with the departure times and the times spent in-home;

an estimation module communicatively coupled to the statistical analyzer, the estimation module estimating one or more tendency parameters based at least in part on the probabilities associated with the departure times and the times spent in-home, each of the one or more tendency parameters reflecting an estimation for a regular daily driving behavior of the vehicle; and a determination module communicatively coupled to the estimation module, the determination module determining a charging setting based at least in part on the one or more tendency parameters, the charging setting comprising a target state of charge (SoC) for a battery.

11. The system of claim 10, wherein the vehicle is a plug-in hybrid vehicle.

12. The system of claim 10, wherein the record further includes one or more a mileage, a battery SoC, and an ignition on (IG-ON) time.

13. The system of claim 10, wherein the one or more tendency parameters include including one or more of a regular departure time, a regular in-home time, and a daily needed battery SoC.

14. The system of claim 10, wherein the charging setting comprises one or more of an aggressive mode with a threshold, a medium mode with a threshold that is higher than the threshold of the aggressive mode, and a conservative mode with a threshold that is higher than the threshold of the medium mode.

15. The system of claim 14, wherein the determination module controlling charging for the vehicle by comparing the threshold with utility rate information.

16. The system of claim 15, wherein the utility rate information describes an electric utility rate for a certain period of time.

17. The system of claim 10, wherein the determination module further providing the charging setting to a user of the vehicle and responsive to receiving a selection of the charging setting from the user, controlling charging for the vehicle based at least in part on the selection of the charging setting.

18. The system of claim 10, wherein the determination module further receiving a change of the charging setting from a user of the vehicle and controlling charging for the vehicle based at least in part on the change of the charging setting.

19. A computer program product comprising a non-transitory computer readable medium encoding instructions that, in response to execution by a computing device, cause the computing device to perform operations comprising:

receiving from the vehicle a record reflecting a driving routine of the vehicle over a period of time, the record including departure times of the vehicle and times of the vehicle spent in-home;

analyzing the departure times of the vehicle and the times of the vehicle spent in-home to determine one or more probabilities associated with the departure times and the times spent in-home;

estimating one or more tendency parameters based at least in part on the probabilities associated with the departure times and the times spent in-home, each of the one or more tendency parameters reflecting an estimation for a regular daily driving behavior of the vehicle; and determining a charging setting based at least in part on the one or more tendency parameters, the charging setting comprising of target state of charge (SoC) for a battery.

20. The computer program product of claim 19, wherein the vehicle is a plug-in hybrid vehicle.

21. The computer program product of claim 19, wherein the record further include one or more of a mileage, a battery SoC, and an ignition on (IG-ON) time.

22. The computer program product of claim 19, wherein the one or more tendency parameters includes one or more of a regular departure time, a regular in-home time, and a daily needed battery SoC.

23. The computer program product of claim 19, wherein the charging setting comprises one or more of an aggressive mode with a threshold, a medium mode with a threshold that is higher than the threshold of the aggressive mode, and a conservative mode with a threshold that is higher than the threshold of the medium mode.

24. The computer program product of claim 23, wherein instructions encoded in the computer readable medium when executed cause the computing device to perform operations further comprising:

controlling charging for the vehicle by comparing the threshold with utility rate information.

25. The computer program product of claim 24, wherein the utility rate information describes an electric utility rate for a certain period of time.

26. The computer program product of claim 19, wherein instructions encoded in the computer readable medium when executed cause the computing device to perform operations further comprising:

providing the charging setting to a user of the vehicle; and responsive to receiving a selection of the charging setting from the user, controlling charging for the vehicle based at least in part on the selection of the charging setting.

27. The computer program product of claim 19, wherein instructions encoded in the computer readable medium when executed cause the computing device to perform operations further comprising:

receiving a change of the charging setting from a user of the vehicle; and controlling charging for the vehicle based at least in part on the change of the charging setting.

* * * * *